United States Patent
Yoon et al.

(10) Patent No.: US 10,742,477 B2
(45) Date of Patent: Aug. 11, 2020

(54) METHOD FOR CONNECTING WEB SERVERS AND WEB APPLICATION SERVERS AND WAS ADMIN SERVER USING THE SAME

(71) Applicant: TMAXSOFT CO., LTD., Seongnam-si (KR)

(72) Inventors: Sung Bae Yoon, Namyangju-si (KR); Young Hwi Jang, Seoul (KR)

(73) Assignee: TMAXSOFT CO., LTD., Seongnam (KR)

( * ) Notice: Subject to any disclaimer, the term of this patent is extended or adjusted under 35 U.S.C. 154(b) by 70 days.

(21) Appl. No.: 16/108,748

(22) Filed: Aug. 22, 2018

(65) Prior Publication Data
US 2019/0068432 A1 Feb. 28, 2019

(30) Foreign Application Priority Data
Aug. 23, 2017 (KR) .......................... 10-2017-0106546

(51) Int. Cl.
| | |
|---|---|
| *G06F 15/173* | (2006.01) |
| *H04L 12/24* | (2006.01) |
| *H04L 29/06* | (2006.01) |
| *H04L 29/08* | (2006.01) |
| *H04L 12/26* | (2006.01) |

(52) U.S. Cl.
CPC .......... *H04L 41/0246* (2013.01); *H04L 41/04* (2013.01); *H04L 43/08* (2013.01); *H04L 43/10* (2013.01); *H04L 67/02* (2013.01); *H04L 67/1002* (2013.01); *H04L 67/34* (2013.01); *H04L 67/42* (2013.01); *H04L 69/16* (2013.01)

(58) Field of Classification Search
CPC ..... H04L 41/0246; H04L 41/04; H04L 43/08; H04L 43/10; H04L 67/02; H04L 67/1002; H04L 67/34; H04L 67/42; H04L 69/16
See application file for complete search history.

(56) References Cited

U.S. PATENT DOCUMENTS

| | | | |
|---|---|---|---|
| 2007/0079290 A1* | 4/2007 | Roth ................... | G06F 11/3668 717/124 |
| 2007/0083630 A1* | 4/2007 | Roth ....................... | H04L 43/50 709/223 |
| 2010/0161574 A1* | 6/2010 | Davidson .............. | G06F 16/217 707/705 |

* cited by examiner

Primary Examiner — Sm A Rahman
(74) Attorney, Agent, or Firm — Xsensus LLP

(57) ABSTRACT

A method for connecting webservers and web application servers (WAS's) is provided. The method includes steps of: (a) a WAS admin server, while managing multiple existing WAS managed servers and communicating with multiple existing webservers, if a new webserver except the multiple existing webservers or a new WAS managed server except the multiple existing WAS managed servers is determined as being operated, receiving connection state information of the new webserver or that of the new WAS managed server; and (b) the WAS admin server delivering the connection state information of the new webserver or that of the new WAS to the multiple existing WAS managed servers and the multiple existing webservers.

14 Claims, 6 Drawing Sheets

METHOD FOR CONNECTING WEB SERVERS AND WEB APPLICATION SERVERS AND WAS ADMIN SERVER USING THE SAME

FIELD OF THE INVENTION

The present invention relates to a method for connecting web servers and web application servers; and more particularly, to the method for connecting the webservers and web application servers (WAS's), including steps of: (a) a WAS admin server, while managing multiple existing WAS managed servers and communicating with multiple existing webservers, if a new webserver except the multiple existing webservers or a new WAS managed server except the multiple existing WAS managed servers is determined as being operated, receiving connection state information of the new webserver or that of the new WAS managed server; and (b) the WAS admin server delivering the connection state information of the new webserver or that of the new WAS to the multiple existing WAS managed servers and the multiple existing webservers, and the WAS admin server using the same.

BACKGROUND OF THE INVENTION

A webserver is a server that receives an HTTP (Hyper-Text Transfer Protocol) request from a client, i.e., an entity requesting a worldwide web ("web") service, and provides a response to the HTTP request, i.e., content such as a webpage, having received from a web application server (WAS), to the client. In addition, the WAS refers to a software engine which receives the request of the client through HTTP from the webserver over the network and responds to the request or hardware including the software engine.

In general, under an environment in which webservers and WAS's are provided, in order to connect the webservers and the WAS's, configurations of the webservers and those of the WAS's must be determined in advance and then be set.

The most common method for such connections is a method of making TCP connections between webservers and WAS's in a proxy way, delivering an HTTP request from one of the webservers to one of the WAS's by using the TCP connections, processing a response to the request. For the connections, as stated above, as the webservers must make the TCP connections with the WAS's, the webservers must know information on the WAS's. In this method, when there occurs any change in at least part of the webservers or the WAS's (e.g., addition of a new WAS or change in a state of any of the existing WAS's), it was necessary to change information on setting. However, it is inconvenient because this requires the existing webservers or the existing WAS's to be restarted to change the information on setting.

To solve the problem, a method of dynamically configuring the webservers or the WAS's was proposed in consideration of whether the number of requests is large or not under a circumstance such as a cloud environment. According to the method, an elastic load balancer (ELB) is installed between the webservers and the WAS's to support the dynamic configuration of the webservers and the WAS's in the cloud environment.

In this method, when a specific webserver makes a TCP connection with the ELB irrespective of information on the WAS's and delivers a request to the ELB, the ELB makes a TCP connection with a specific WAS among the dynamically changed WAS's and delivers the request to the specific WAS. Accordingly, a newly-added webserver can be connected with the WAS's if the newly-added webserver knows only information on the ELB.

But this method causes a problem of passing through an additional network hop because it requires to install an additional device for operating the ELB between webservers and WAS's. In addition, it has additional problem of doubling the TCP connections compared to the existing connections. Further, it has still another problem of making the webservers have only a proxy role simply as a delivery function while throwing away an advantage of the webservers, e.g., an advantage of sessions-based scheduling, due to a shift of the responsibility to schedule the WAS's to the ELB. Besides, it has still yet another problem in that only one ELB may be deluged with many requests as the case may be. Accordingly, serious performance degradation may occur. Further, in order to avoid such serious performance degradation, another ELB may be required to be added.

Accordingly, to solve such problems, a new connection technology capable of managing a dynamically changing network situation without a separate equipment between the webservers and the WAS's is proposed.

SUMMARY OF THE INVENTION

It is an object of the present invention to provide a connection technology capable of dynamically configuring webservers and WAS's without any separate ELB.

It is another object of the present invention to provide a connection method which is not necessary to pass through an additional network hop without using an existing proxy way.

It is still another object of the present invention to provide a connection method of making the webservers and the WAS's share their states and necessary information with each other effectively.

In accordance with one aspect of the present invention, there is provided a method for connecting webservers and web application servers (WAS's) including steps of: (a) a WAS admin server, while managing multiple existing WAS managed servers and communicating with multiple existing webservers, if a new webserver except the multiple existing webservers or a new WAS managed server except the multiple existing WAS managed servers is determined as being operated, receiving connection state information of the new webserver or that of the new WAS managed server; and (b) the WAS admin server delivering the connection state information of the new webserver or that of the new WAS to the multiple existing WAS managed servers and the multiple existing webservers.

As one example, the method further includes a step of: (c) the WAS admin server detecting and managing change of connection state information of at least some of the existing WAS managed servers, the new WAS managed server, the existing webservers, and the new webserver.

As one example, at the step of (c), if detecting change of connection state information of a specific WAS managed server among the existing WAS managed servers and the new WAS managed server, the WAS admin server delivers the change of the connection state information to at least some of the existing WAS managed servers, the new WAS managed server, the existing webservers, and the new webserver, except the specific WAS managed server.

As one example, at the step of (c), if detecting change of connection state information of a specific webserver among the existing webservers and the new webserver, the WAS admin server delivers the change of the connection state information to at least some of the existing WAS managed servers, the new WAS managed server, the existing webservers, and the new webserver, except the specific webserver.

As one example, at the step of (c), the WAS admin server monitors operating state information of at least some of the existing webservers, the new webserver, the existing WAS managed servers, and the new WAS managed server and delivers the monitored operating state information to at least some of the existing WAS managed servers, the new WAS managed server, the existing webservers, and the new webserver.

As one example, at the step of (c), if the change of the connection state information includes shut-down of a specific webserver among the existing webservers and the new webserver, the WAS admin server delivers information on the shut-down of the specific webserver to at least some of the existing WAS managed servers, the new WAS managed server, the existing webservers, and the new webserver, except the specific webserver.

As one example, at the step of (c), if the specific webserver is shut down without delivering information on its shut-down to the WAS admin server, the WAS admin server checks whether the specific webserver is shut down or not through a check of a ping to the specific webserver; and wherein, if it is confirmed that the specific webserver has been shut down through the check of the ping, the WAS admin server delivers information on the shut-down of the specific webserver to at least some of the existing WAS managed servers, the new WAS managed server, the existing webservers, and the new webserver, except the specific webserver.

As one example, before the step of (a), the method further includes a step of: the WAS admin server and the existing WAS managed servers making certain number of TCP connections with the existing webservers; wherein the WAS admin server and the existing WAS managed servers receive a request from the existing webservers at the state of TCP connections, and the existing webservers pool and use at least some of the certain number of TCP connections.

In accordance with another aspect of the present invention, there is provided a WAS admin server for connecting webservers and web application servers (WAS's), including: a communication part for, while managing multiple existing WAS managed servers and communicating with multiple existing webservers, if a new webserver except the multiple existing webservers or a new WAS managed server except the multiple existing WAS managed servers is determined as being operated, receiving connection state information of the new webserver or that of the new WAS managed server; and a processor for delivering the connection state information of the new webserver or that of the new WAS to the multiple existing WAS managed servers and the multiple existing webservers through the communication part.

As one example, the processor performs a process of detecting and managing change of connection state information of at least some of the existing WAS managed servers, the new WAS managed server, the existing webservers, and the new webserver.

As one example, if detecting change of connection state information of a specific WAS managed server among the existing WAS managed servers and the new WAS managed server, the processor delivers the change of the connection state information to at least some of the existing WAS managed servers, the new WAS managed server, the existing webservers, and the new webserver, except the specific WAS managed server.

As one example, if detecting change of connection state information of a specific webserver among the existing webservers and the new webserver, the processor delivers the change of the connection state information to at least some of the existing WAS managed servers, the new WAS managed server, the existing webservers, and the new webserver, except the specific webserver.

As one example, the processor monitors operating state information of at least some of the existing webservers, the new webserver, the existing WAS managed servers, and the new WAS managed server and delivers the monitored operating state information to at least some of the existing WAS managed servers, the new WAS managed server, the existing webservers, and the new webserver.

As one example, if the change of the connection state information includes shut-down of a specific webserver among the existing webservers and the new webserver, the processor delivers information on the shut-down of the specific webserver to at least some of the existing WAS managed servers, the new WAS managed server, the existing webservers, and the new webserver, except the specific webserver.

As one example, if the specific webserver is shut down without delivering information on its shut-down to the WAS admin server, the processor checks whether the specific webserver is shut down or not through a check of a ping to the specific webserver; and wherein, if it is confirmed that the specific webserver has been shut down through the check of the ping, the processor delivers information on the shut-down of the specific webserver to at least some of the existing WAS managed servers, the new WAS managed server, the existing webservers, and the new webserver, except the specific webserver.

As one example, the processor establishes certain number of TCP connections of the WAS admin server and the existing WAS managed servers with the existing webservers; and wherein the WAS admin server and the existing WAS managed servers receive a request from the existing webservers at the state of TCP connections, and the existing webservers pool and use at least some of the certain number of TCP connections.

BRIEF DESCRIPTION OF THE DRAWINGS

The drawings attached below to explain example embodiments of the present invention are only part of example embodiments of the present invention and other drawings may be obtained based on the drawings without inventive work for those skilled in the art.

DETAILED DESCRIPTION OF THE PREFERRED EMBODIMENTS

Figure 1:
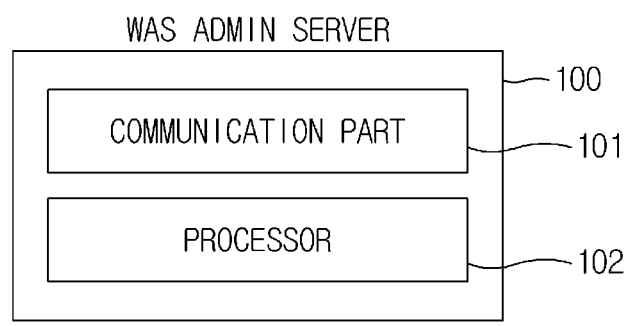
FIG. 1 is a block diagram schematically illustrating a configuration of a WAS admin server in accordance with the present invention.

Detailed explanations of the present invention explained below refer to attached drawings that illustrate specific embodiment examples of this present that may be executed. These embodiments are described in sufficient detail to enable those skilled in the art to practice the invention. It is to be understood that the various embodiments of the present invention, although different, are not necessarily mutually exclusive. For example, a particular feature, structure, or characteristic described herein in connection with one embodiment may be implemented within other embodiments without departing from the spirit and scope of the present invention. In addition, it is to be understood that the position or arrangement of individual elements within each disclosed embodiment may be modified without departing from the spirit and scope of the present invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

To make it easy for those who have common knowledge in the art to which the present invention pertains to implement the present invention, detailed explanation on desirable embodiment examples of the present invention will be made by referring to attached drawings.

FIG. 1 is a block diagram schematically illustrating a configuration of a WAS admin server in accordance with the present invention.

By referring to FIG. 1, a WAS admin server 100 may include a communication part 101 and a processor 102. The communication part 101 of the WAS admin server 100 transmits information to, and receives information from, multiple webservers and multiple WAS managed servers. In particular, if a new webserver except multiple existing webservers or a new WAS managed server except multiple existing WAS managed servers is determined as being operated, the communication part 101 has a function of receiving connection state information of the new webserver or the new WAS managed server.

The processor 102 of the WAS admin server 100 has a function of managing connections between the webservers and the WAS managed servers and providing a service of managing a group of the WAS managed servers.

Figure 2:
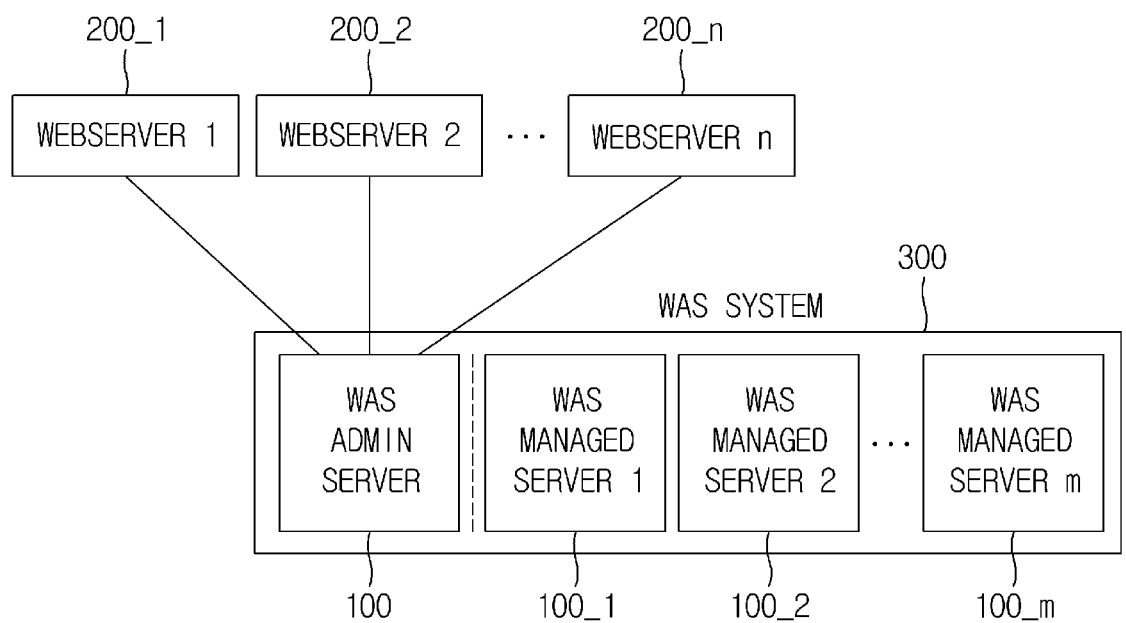
FIG. 2 shows a configuration briefly illustrating connections between webservers and WAS managed servers in accordance with the present invention.

FIG. 2 shows a configuration briefly illustrating connections between the webservers and the WAS managed servers in accordance with the present invention.

For reference, the "WAS managed servers" stated in the specification of the present invention were named to emphasize that they are servers managed by the WAS admin server 100 and actually they could refer to general WAS's.

By referring to FIG. 2, a WAS system 300 includes at least one WAS admin server 100 and multiple WAS managed servers 100_1, 100_2, . . . , 100_m. For reference, in FIG. 2, it is illustrated that the WAS admin server 100 is included in the WAS system 300, but it is not limited to this. It could be outside the WAS system 300.

When a domain is first set to establish connections between the webservers and the WAS managed servers, basically one WAS admin server 100 is set. The WAS admin server 100 as a domain administration server (DAS) communicates with management tools such as WebAdmin, jeusadmin capable of managing settings between servers in the domain, all applications and resources in the domain, and controlling and monitoring the servers in the domain. The WAS admin server may be presumed to be set in one server per domain. After that, a server newly provided in the domain may be added as a new WAS managed server. These WAS managed servers 100_1, 100_2, . . . , 100_m are provided only for web services.

In FIG. 2, the WAS admin server 100 communicates with multiple webservers 200_1, 200_2, . . . , 200_n and manages the multiple WAS managed servers 100_1, 100_2, . . . , 100_m in the domain.

Figure 3:
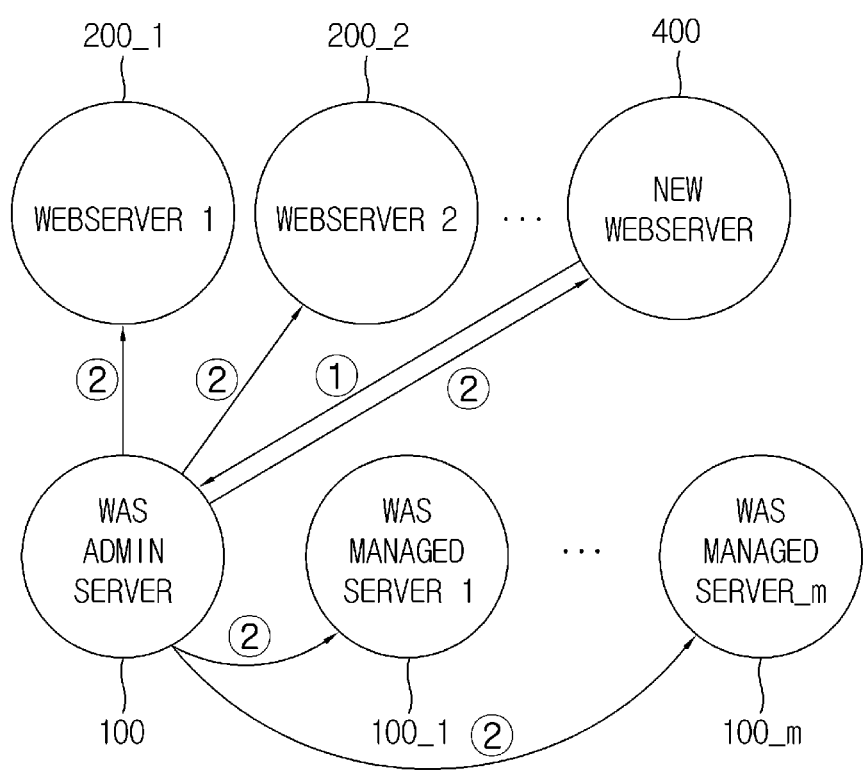
FIG. 3 illustrates a method for connecting the webservers and the WAS managed servers in case a new webserver is added in accordance with the present invention.

FIG. 3 illustrates a method for connecting the webservers and the WAS managed servers in case a new webserver is added in accordance with the present invention.

In the present invention, the WAS managed servers make as many TCP connections with the webservers as required in advance and receive requests from the webservers. While the TCP connections between the WAS managed servers and the webservers are established, the webservers pool and use the TCP connections. After that, the webservers deliver HTTP requests and receive responses from the WAS managed servers in order to deliver the responses to their corresponding clients. To this end, the WAS system 300 must have information on the webservers in advance. The present invention proposes a method of making a function of receiving information on dynamic change and that of delivering the information on dynamic change to both the webservers and the WAS managed servers be included in the WAS admin server 100 under an environment where the webservers are dynamically changed, e.g., under a situation where a new webserver is added or one of the existing webservers is deleted.

By referring to FIG. 3, while the WAS admin server 100 manages multiple existing WAS managed servers 100_1, 100_2, . . . , 100_m and communicates with multiple existing webservers 200_1, 200_2, . . . , 200_n, ① if a new webserver 400 except the multiple existing webservers 200_1, 200_2, . . . , 200_n is determined as being operated, the WAS admin server 100 receives connection state information of the new webserver 400. After that, ② the WAS admin server 100 delivers the connection state information of the new webserver 400 to the multiple existing WAS managed servers 100_1, 100_2, . . . , 100_m and the multiple existing webservers 200_1, 200_2, . . . , 200_n.

In other words, if the new webserver 400 makes a connection with the WAS admin server 100 as soon as it is operated and informs the WAS admin server 100 that it starts its operation, the WAS admin server 100 detects that the webserver 400 has been newly added and delivers the detected information to the multiple existing webservers 200_1, 200_2, . . . , 200_n and the multiple existing WAS managed servers 100_1, 100_2, . . . , 100_m as shown in FIG. 3. Herein, the WAS admin server 100 may deliver the detected information even to the new webserver 400.

As such, when the new webserver 400 is added, the WAS admin server 100 may inform the existing webservers 200_1, 200_2, . . . , 200_n of the connection state information regarding the addition of the new webserver 400. For example, if the existing webservers 200_1, 200_2, 200_n receive the information on a fact that the new webserver 400 has been added, the existing webservers 200_1, 200_2, . . . , 200_n can recognize that client connections increase. Accordingly, the existing webservers 200_1, 200_2, 200_n may allow load to be distributed to the new webserver 400 by terminating some of the client connections connected with themselves and allowing new connections with the new webserver 400 to be established.

In FIG. 3, an example of the new webserver 400 being newly operated was illustrated, but the present invention may also be applied to another example of the new WAS managed server (not illustrated) being newly operated. For example, if the new WAS managed server except the multiple existing WAS managed servers 100_1, 100_2, ..., 100_m is determined as being operated, the WAS admin server 100 receives the connection state information of the new WAS managed server (not illustrated) and delivers the connection state information of the new WAS managed server to the multiple existing WAS managed servers 100_1, 100_2, ..., 100_m and the multiple existing webservers 200_1, 200_2, ..., 200_n.

Figure 4:
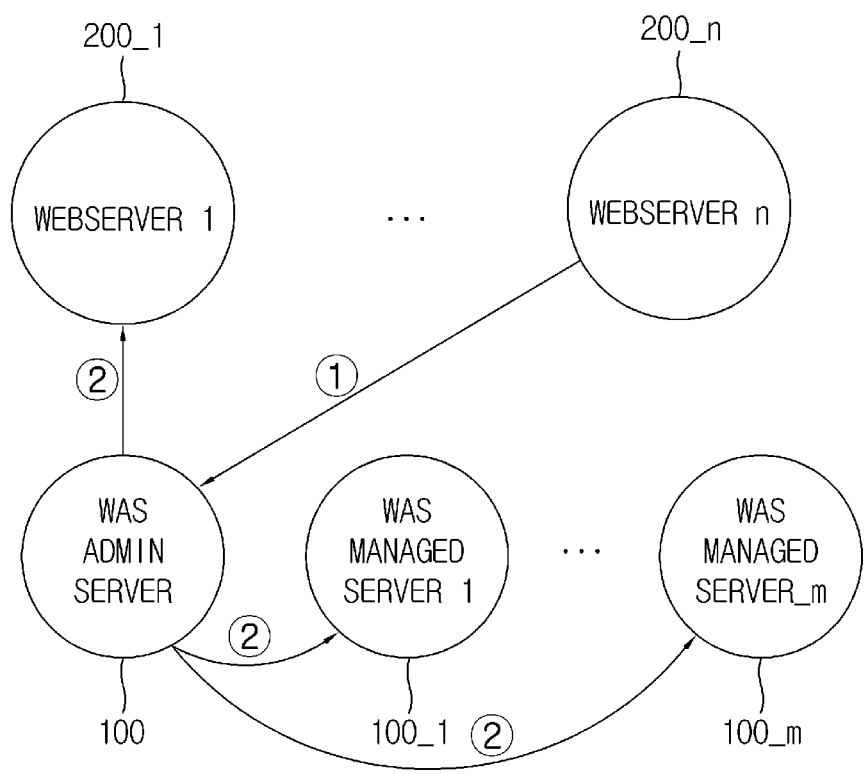
FIG. 4 represents a method for connecting the webservers and the WAS managed servers in case a specific webserver is shut down in accordance with the present invention.

FIG. 4 represents a method for connecting the webservers and the WAS managed servers in case a specific webserver is shut down in accordance with the present invention.

The WAS admin server 100 in accordance with the present invention performs a function of detecting and managing change of connection state information of the multiple existing WAS managed servers 100_1, 100_2, ..., 100_m, the new WAS managed server which is not illustrated, the existing webservers 200_1, 200_2, ..., 200_n, and the new webserver which is not illustrated. If the processor 102 of the WAS admin server 100 detects a change in the connection state information of a specified WAS managed server among (i) the multiple existing WAS managed servers 100_1, 100_2, ..., 100_m and (ii) the new WAS managed server if any, the processor 102 of the WAS admin server 100 has a function of delivering the change in the connection state information to (i) the other WAS managed servers except the specific WAS managed server, (ii) the existing webservers 200_1, 200_2, ..., 200_n, and (iii) the new webserver if any.

Similarly, if the processor 102 of the WAS admin server 100 detects a change in the connection state information of a specified webserver among (i) the existing webservers 200_1, 200_2, ..., 200_n and (ii) the new webserver if any, the processor 102 of the WAS admin server 100 delivers the change in the connection state information to (i) the other webservers except the specific webserver, (ii) the existing WAS managed servers 100_1, 100_2, ..., 100_m, and (iii) the new WAS managed server if any.

By referring to an example illustrated in FIG. 4, ① when a specific webserver, e.g., an n-th webserver 200_n in FIG. 4, among the webservers 200_1, 200_2, ..., 200_n is shut down, the specific webserver informs the WAS admin server 100 that the specific webserver has been shut down. Then, ② the WAS admin server 100 delivers information on the shut-down of the specific webserver to the WAS managed servers 100_1, 100_2, ..., 100_m, and the other webservers except the specific webserver.

In FIG. 4, the state of the new webserver (not illustrated) or the new WAS managed server (not illustrated) being not connected with the WAS admin server 100 was illustrated, but the webservers in FIG. 4 may include the new webserver, and the WAS managed servers in FIG. 4 may include the new WAS managed server. If the new webserver or the new WAS managed server is connected with the WAS admin server 100, the WAS admin server 100 may deliver information on the shut-down of the specific webserver even to the new webserver or the new WAS managed server.

Figure 5:
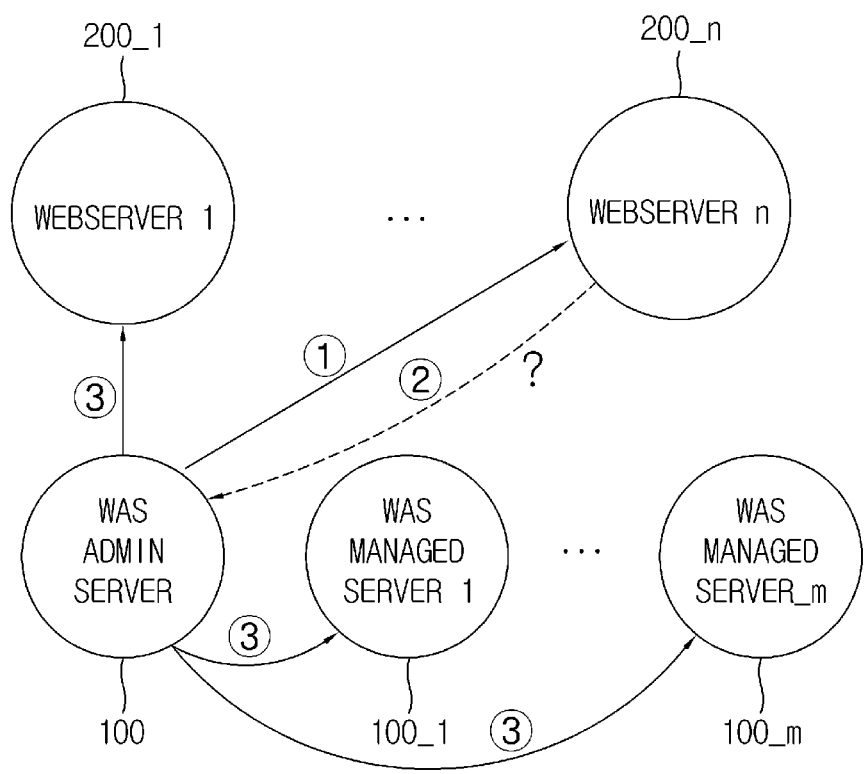
FIG. 5 illustrates a method for connecting the webservers and the WAS managed servers in case a specific webserver is illegally shut down in accordance with the present invention.

FIG. 5 illustrates a method for connecting the webservers and the WAS managed servers in case a specific webserver is illegally shut down in accordance with the present invention.

By referring to FIG. 5, if a specific webserver, e.g., an n-th webserver 200_n in FIG. 4, among the webservers 200_1, 200_2, ..., 200_n, is illegally shut down without informing the WAS admin server 100 of its shut-down, ① the WAS admin server 100 detects the shut-down of the specific webserver through a ping test and ② if it is detected that the specific webserver has been shut down through the ping test, ③ the WAS admin server 100 delivers information on the shut-down of the specific webserver to the WAS managed servers 100_1, 100_2, ..., 100_m and the other webservers except the specific webserver.

Figure 6:
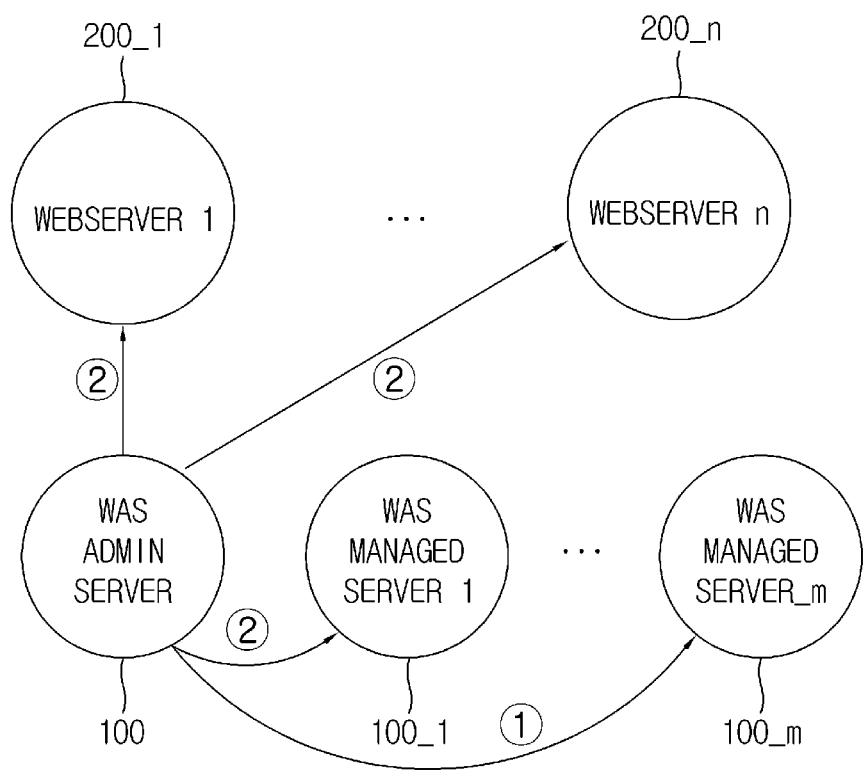
FIG. 6 is a flowchart showing a group managed service of the WAS admin server in accordance with the present invention.

FIG. 6 is a flowchart showing a group managed service of the WAS admin server in accordance with the present invention.

By referring to FIG. 6, the WAS admin server 100 may monitor operating state information of the WAS managed servers 100_1, 100_2, ..., 100_m and the webservers 200_1, 200_2, ..., 200_n and deliver the monitored operating state information to other servers connected with itself.

Similarly, FIG. 6 illustrates the state of the new webserver (not illustrated) or the new WAS managed server (not illustrated) not being connected with the WAS admin server 100, but the webservers in FIG. 6 may include the new webserver and the WAS managed servers in FIG. 6 may include the new WAS managed server.

In FIG. 6, the WAS admin server 100 delivers dynamically changed information of the WAS managed servers 100_1, 100_2, ..., 100_m, i.e., the operating state information, to the webservers 200_1, 200_2, ..., 200_n and the other WAS managed servers connected with itself.

The WAS admin server 100 that has recognized the information on the change in the operating states of the WAS managed servers 100_1, 100_2, ..., 100_m distributes HTTP requests based on session information, etc. of the individual WAS managed servers 100_1, 100_2, ..., 100_m and makes the individual WAS managed servers 100_1, 100_2, ..., 100_m operate effectively. Accordingly, advantages that the existing webservers have may be fully used in the present invention.

In FIG. 6, an example of the WAS admin server 100 managing the operating state information of the WAS managed server was illustrated, but as explained above, the WAS admin server 100 may manage operating states of the webservers and at the time, the WAS admin server 100 may deliver dynamically changed information of the webservers 200_1, 200_2, ..., 200_n, i.e., the operating state information, to the WAS managed servers 100_1, 100_2, ..., 100_m and the other webservers connected with itself.

In the present invention, the WAS admin server may detect changed configurations of the webservers and the WAS managed servers and share their information with the webservers and the WAS managed servers, thereby allowing dynamic connections between the webservers and the WAS's even without any interim network hop.

In addition, functions provided by the dynamic configuration between the webservers and the WAS's may be same as those provided by any static configuration between the webservers and the WAS's.

Furthermore, the present invention has an advantage that it is not necessary to perform an additional process of the WAS managed server(s) to deliver the state information of the WAS managed servers by using a function of the WAS admin server of managing the WAS managed servers.

The present invention may be understood by those skilled in the art and signals, as stated above, such as the ping test, the connection state information, and the operating state information may be transmitted or received by respective communication parts of the webservers and the WAS's and data including the TCP connection information may be possessed and maintained by respective processors and/or respective memories of the webservers and the WAS's but they are not limited to these.

In accordance with the present invention, the WAS admin server may provide the connections between the webservers and the WAS's in a dynamically changing network environment without a separate ELB between the webservers and the WAS's.

In accordance with the present invention, the WAS's may further use a method of the WAS's first making the TCP connections with the webservers and then the webservers pooling the TCP connections, instead of the proxy method.

In accordance with the present invention, the webservers and the WAS's may effectively deliver and share their states and required information with each other without any additional network hop.

The objects of the technical solution of the present invention or parts contributing to the prior art can be implemented in a form of executable program command through a variety of computer means and can be recorded to computer readable recording media. The computer readable media may include solely or in combination, program commands, data files, and data structures. The program commands recorded to the media may be components specially designed for the present invention or may be usable to a skilled person in a field of computer software. Computer readable record media include magnetic media such as hard disk, floppy disk, and magnetic tape, optical media such as CD-ROM and DVD, magneto-optical media such as floptical disk and hardware devices such as ROM, RAM, and flash memory specially designed to store and carry out programs. Program commands include not only a machine language code made by a compiler but also a high-level code that can be used by an interpreter etc., which is executed by a computer. The aforementioned hardware devices can work as more than a software module to perform the action of the present invention and they can do the same in the opposite case. The hardware devices may be combined with memory such as ROM and RAM to store program commands and include a processor such as CPU or GPU composed to execute commands stored in the memory and also include a communication part for sending and receiving signals with external devices.

As seen above, the present invention has been explained by specific matters such as detailed components, limited embodiments, and drawings. While the invention has been shown and described with respect to the preferred embodiments, it, however, will be understood by those skilled in the art that various changes and modification may be made without departing from the spirit and scope of the invention as defined in the following claims.

Accordingly, the thought of the present invention must not be confined to the explained embodiments, and the following patent claims as well as everything including variants equal or equivalent to the patent claims pertain to the category of the thought of the present invention.

What is claimed is:

1. A method for connecting webservers and web application servers (WAS's), comprising steps of:

an WAS admin server and multiple existing WAS managed servers making certain number of TCP connections with multiple existing webservers;

wherein the WAS admin server and the multiple existing WAS managed servers receive a request from the multiple existing webservers at the state of TCP connections, and the multiple existing webservers pool and use at least some of the certain number of TCP connections (a) the WAS admin server, while managing the multiple existing WAS managed servers and communicating with the multiple existing webservers, in response to a new webserver other than the multiple existing webservers or a new WAS managed server other than the multiple existing WAS managed servers is determined as being operated, receiving connection state information of the new webserver or connection state information of the new WAS managed server; and (b) the WAS admin server delivering the connection state information of the new webserver or the connection state information of the new WAS to the multiple existing WAS managed servers and the multiple existing webservers, wherein a specific server is selected among multiple servers in a WAS system, and wherein the specific server is set as the WAS admin server when a domain is first set to establish connections between the webservers and the WAS managed servers.

2. The method of claim 1, further comprising a step of:

(c) the WAS admin server detecting and managing change of connection state information of at least some of the existing WAS managed servers, the new WAS managed server, the existing webservers, and the new webserver.

3. The method of claim 2, wherein, at the step of (c), in response to detecting change of connection state information of a specific WAS managed server among the existing WAS managed servers and the new WAS managed server, the WAS admin server delivers the change of the connection state information to at least some of the existing WAS managed servers, the new WAS managed server, the existing webservers, and the new webserver, except the specific WAS managed server.

4. The method of claim 2, wherein, at the step of (c), in response to detecting change of connection state information of a specific webserver among the existing webservers and the new webserver, the WAS admin server delivers the change of the connection state information to at least some of the existing WAS managed servers, the new WAS managed server, the existing webservers, and the new webserver, except the specific webserver.

5. The method of claim 2, wherein, at the step of (c), the WAS admin server monitors operating state information of at least some of the existing webservers, the new webserver, the existing WAS managed servers, and the new WAS managed server and delivers the monitored operating state information to at least some of the existing WAS managed servers, the new WAS managed server, the existing webservers, and the new webserver.

6. The method of claim 2, wherein, at the step of (c), in response to the change of the connection state information includes shut-down of a specific webserver among the existing webservers and the new webserver, the WAS admin server delivers information on the shut-down of the specific webserver to at least some of the existing WAS managed servers, the new WAS managed server, the existing webservers, and the new webserver, except the specific webserver.

7. The method of claim 6, wherein, at the step of (c), in response to the specific webserver being shut down without delivering information on its shut-down to the WAS admin server, the WAS admin server checks whether the specific webserver is shut down or not through a check of a ping to the specific webserver; and wherein, in response to it being confirmed that the specific webserver has been shut down through the check of the ping, the WAS admin server delivers information on the shut-down of the specific webserver to at least some of the existing WAS managed servers, the new WAS managed server, the existing webservers, and the new webserver, except the specific webserver.

8. A WAS admin server for connecting webservers and web application servers (WAS's), comprising:

a transceiver that, while managing multiple existing WAS managed servers and communicating with multiple existing webservers, in response to a new webserver other than the multiple existing webservers or a new WAS managed server other than the multiple existing WAS managed servers is determined as being operated, receives connection state information of the new webserver or connection state information of the new WAS managed server; and a processor configured to deliver the connection state information of the new webserver or the connection state information of the new WAS to the multiple existing WAS managed servers and the multiple existing webservers through the transceiver, wherein a specific server is selected among multiple servers in a WAS system, and wherein the specific server is set as the WAS admin server when a domain is first set to establish connections between the webservers and the WAS managed servers, wherein the processor establishes certain number of TCP connections of the WAS admin server and the existing WAS managed servers with the existing webservers; and wherein the WAS admin server and the existing WAS managed servers receive a request from the existing webservers at the state of TCP connections, and the existing webservers pool and use at least some of the certain number of TCP connections.

9. The WAS admin server of claim 8, wherein the processor performs a process of detecting and managing change of connection state information of at least some of the existing WAS managed servers, the new WAS managed server, the existing webservers, and the new webserver.

10. The WAS admin server of claim 9, wherein, in response to detecting change of connection state information of a specific WAS managed server among the existing WAS managed servers and the new WAS managed server, the processor delivers the change of the connection state information to at least some of the existing WAS managed servers, the new WAS managed server, the existing webservers, and the new webserver, except the specific WAS managed server.

11. The WAS admin server of claim 9, wherein, in response to detecting change of connection state information of a specific webserver among the existing webservers and the new webserver, the processor delivers the change of the connection state information to at least some of the existing WAS managed servers, the new WAS managed server, the existing webservers, and the new webserver, except the specific webserver.

12. The WAS admin server of claim 9, wherein the processor monitors operating state information of at least some of the existing webservers, the new webserver, the existing WAS managed servers, and the new WAS managed server and delivers the monitored operating state information to at least some of the existing WAS managed servers, the new WAS managed server, the existing webservers, and the new webserver.

13. The WAS admin server of claim 9, wherein, in response to the change of the connection state information includes shut-down of a specific webserver among the existing webservers and the new webserver, the processor delivers information on the shut-down of the specific webserver to at least some of the existing WAS managed servers, the new WAS managed server, the existing webservers, and the new webserver, except the specific webserver.

14. The WAS admin server of claim 13, wherein, in response to the specific webserver being shut down without delivering information on its shut-down to the WAS admin server, the processor checks whether the specific webserver is shut down or not through a check of a ping to the specific webserver; and wherein, in response to it being confirmed that the specific webserver has been shut down through the check of the ping, the processor delivers information on the shut-down of the specific webserver to at least some of the existing WAS managed servers, the new WAS managed server, the existing webservers, and the new webserver, except the specific webserver.

* * * * *